United States Patent
Takahashi et al.

(10) Patent No.: US 6,632,564 B1
(45) Date of Patent: Oct. 14, 2003

(54) NON-AQUEOUS ELECTROLYTE AND NON-AQUEOUS ELECTROLYTE CELL

(75) Inventors: Tadayoshi Takahashi, Neyagawa (JP); Shinichi Kawaguchi, Kishiwada (JP); Nobuharu Koshiba, Nara (JP)

(73) Assignee: Matsushita Electric industrial Co., Ltd., Osaka (JP)

( * ) Notice: Subject to any disclaimer, the term of this patent is extended or adjusted under 35 U.S.C. 154(b) by 102 days.

(21) Appl. No.: 09/889,180

(22) PCT Filed: Nov. 28, 2000

(86) PCT No.: PCT/JP00/08377

§ 371 (c)(1), (2), (4) Date: Jul. 11, 2001

(87) PCT Pub. No.: WO01/41248

PCT Pub. Date: Jun. 7, 2001

(30) Foreign Application Priority Data

Nov. 29, 1999 (JP) .............................. 11-337128
Nov. 29, 1999 (JP) .............................. 11-337129

(51) Int. Cl.$^7$ ............................................... H01M 10/40
(52) U.S. Cl. ........................ 429/188; 429/322; 252/62.2
(58) Field of Search ................................ 429/188, 322; 252/62.2

(56) References Cited

U.S. PATENT DOCUMENTS 5,888,672 A 3/1999 Gustafson et al.
6,171,522 B1 * 1/2001 Michot et al. .............. 252/500

FOREIGN PATENT DOCUMENTS

JP     10-261435 A     9/1998
JP     2000-294273 A     10/2000

* cited by examiner

Primary Examiner—Mark Ruthkosky
(74) Attorney, Agent, or Firm—Akin Gump Strauss Hauer & Feld, L.L.P.

(57) ABSTRACT

In a non-aqueous electrolyte comprising an organic solvent and a solute dissolved in the organic solvent, a lithium salt containing at least one organic anion selected from phthalimide, a derivative of phthalimide, phthalimidine and a derivative of phthalimidine is used as the solute. Such non-aqueous electrolyte is not liable to react with the negative electrode in a primary battery and a secondary battery during a long-term storage at high temperatures. As a consequence, by using this non-aqueous electrolyte, a non-aqueous electrolyte battery having an excellent storage property can be obtained; and the charge/discharge cycle characteristics are improved in a secondary battery.

5 Claims, 1 Drawing Sheet

NON-AQUEOUS ELECTROLYTE AND NON-AQUEOUS ELECTROLYTE CELL

TECHNICAL FIELD

The present invention relates to an improvement in a non-aqueous electrolyte comprising a solvent and a solute dissolved in the solvent. The present invention also relates to a non-aqueous electrolyte battery which contains an improved non-aqueous electrolyte, and which is excellent in the storage property and in the charge/discharge cycle characteristics.

BACKGROUND ART

In recent years, there has been advancement in the realization of small and lightweight electronic devices, and along with that, there has also been an increased demand for batteries having high energy densities. Accordingly, intensive researches have been made on lithium primary batteries having a negative electrode comprising metallic lithium as well as lithium ion secondary batteries having a negative electrode comprising a carbon material.

In such batteries, as a solvent for constituting a non-aqueous electrolyte, propylene carbonate, ethylene carbonate, butylene carbonate, sulfolane, γ-butyrolactone, dimethyl carbonate, diethyl carbonate, 1,2-dimethoxyethane, tetrahydrofuran, dioxolane and the like are used singly or as a mixture. Further, as a solute to, be dissolved in the solvents, $LiClO_4$, $LiPF_6$, $LiBF_4$, $LiCF_3SO_3$, $LiN(CF_3SO_2)_2$, $LiN(C_2F_5SO_2)_2$ are used singly or as a mixture.

Recently, intensive researches have been made on lithium polymer batteries containing a gel non-aqueous electrolyte or a solid polymer electrolyte. The gel non-aqueous electrolyte contains a host polymer for retaining the solute and the solvent as described above. The solid polymer electrolyte is an electrolyte in which the polymer itself functions as the solvent for the solute, and a polymer similar to the host polymer contained in the gel-like non-aqueous electrolyte is used, for example.

As the polymers constituting these electrolytes, derivatives formed on the basis of polyvinylidene fluoride, polyethylene oxide, polyacrylonitrile, polymethyl methacrylate, polysiloxane and the like are used.

These constituting elements, of the non-aqueous electrolyte are known to chemically, react with moisture and the electrodes inside the battery. In particular, metal lithium, lithium alloys (LiAl, LiSn and the like) and carbon materials capable of absorbing and desorbing lithium, which constitute the negative electrode, are highly reactive with the constituting elements of the non-aqueous electrolyte, and they form an organic coating film on the surface of the negative electrode by chemical reactions and the like, thereby to decrease the battery capacity.

In a primary battery as well as in a secondary battery, the longer the storage period of the battery and the higher the storage temperatures, the more obvious the influence of the chemical reactions becomes and the more significantly the capacity deteriorates. Also, there is the problem that repetition of the charge/discharge cycle of the secondary battery causes capacity deterioration.

In order to suppress the reaction between the negative electrode and the non-aqueous electrolyte during a storage, there has been proposed in Japanese Laid-Open Patent Publication No. 6-215775 to make the non-aqueous electrolyte contain a salt comprising a specific organic anion and a metal cation. However, even in the battery containing the non-aqueous electrolyte proposed in the above publication, deterioration in the battery capacity is observed during a long-term storage at high temperatures; in secondary batteries, a decrease in the discharge capacity is observed at the time of repetition of the charge/discharge cycle.

In the present invention, used is a non-aqueous electrolyte which is not liable to react with the negative electrode in a primary battery or a secondary battery during a long-term storage at high temperatures, and which does not lead to a decrease in the capacity during the charge/discharge cycles in a secondary battery.

DISCLOSURE OF INVENTION

The present invention relates to a non-aqueous electrolyte comprising a solvent and a solute dissolved in the solvent, wherein the solute comprises at least one selected from the group consisting of lithium salts represented by the general formula (1):

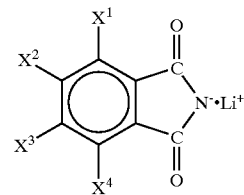

where $X^1$ to $X^4$ are independently hydrogen atoms, F, Cl, Br, I or alkyl groups having 1 to 3 carbon atoms, and lithium salts represented by the general formula (2):

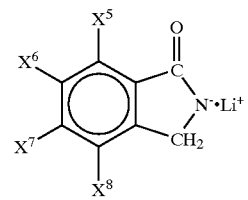

where $X^5$ to $X^8$ are independently hydrogen atoms, F, Cl, Br, I or alkyl groups having 1 to 3 carbon atoms.

The aforementioned solute may further comprise $LiPF_6$, $LiBF_4$, $LiClO_4$, $LiCF_3SO_3$ and lithium salts having an imide bond represented by the general formula (3):

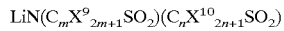

$$LiN(C_mX^9{}_{2m+1}SO_2)(C_nX^{10}{}_{2n+1}SO_2)$$

where $X^9$ and $X^{10}$ are independently F, Cl, Br or I, and m and n are independently integers of 1 to 4. Among these, lithium salts having an imide bond represented by the general formula (3) are particularly preferred.

Specific examples of lithium salts having an imide bond represented by the general formula (3) include $LiN(CF_3SO_2)_2$, $LiN(C_2F_5SO_2)_2$ and $LiN(CF_3SO_2)(C_4F_9SO_2)$. Among these, $LiN(CF_3SO_2)_2$ and/or $LiN(C_2F_5SO_2)_2$ are particularly preferred.

As the aforementioned solvent, an organic solvent is preferred, and it preferably comprises at least one selected from the group consisting of ethylene carbonate, propylene carbonate, butylene carbonate and γ-butyrolactone.

The concentration of the lithium salt represented by the general formula (1) and/or the lithium salt represented by the general formula (2) is preferably 0.2 to 2.0 mol/liter from the viewpoint of the solubility of the lithium salt and the electric resistance. Also, in the case where the aforementioned solute comprises the lithium salt represented by the general formula (1) and/or the lithium salt represented by the general formula (2) together with another lithium salt, the concentration of the total of the lithium salts are preferably 0.2 to 2.0 mol/liter from the same viewpoint.

The present invention also relates to a non-aqueous electrolyte battery comprising; a positive electrode; a negative electrode comprising at least one selected from the group consisting of metallic lithium, an lithium alloy, and a material capable of absorbing and desorbing lithium; and a non-aqueous electrolyte of the present invention.

BEST MODE FOR CARRYING OUT THE INVENTION

Figure 1:
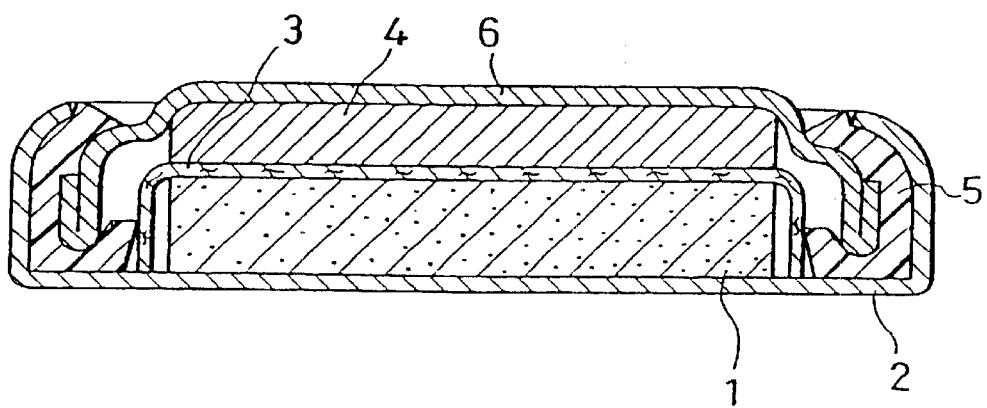
FIG. 1 is a longitudinal cross sectional view showing the constitution of the non-aqueous electrolyte battery of the present invention.

The non-aqueous electrolyte of the present invention includes a liquid non-aqueous electrolyte, a gel non-aqueous electrolyte and a solid polymer electrolyte. The liquid non-aqueous electrolyte contains an organic solvent as the solvent. The gel non-aqueous electrolyte generally comprises the liquid non-aqueous electrolyte described above and a host polymer retaining thereof. In the solid polymer electrolyte, the polymer itself functions as the solvent. The present invention is characterized in the solute to be dissolved in these solvents.

The non-aqueous electrolyte in accordance with the present invention comprises at least one selected from the group consisting of lithium salts represented by the general formula (1):

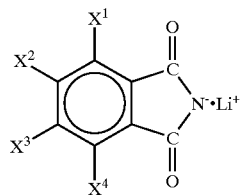

where $X^1$ to $X^4$ are independently hydrogen atoms, F, Cl, Br, I or alkyl groups having 1 to 3 carbon atoms, and lithium salts represented by the general formula (2):

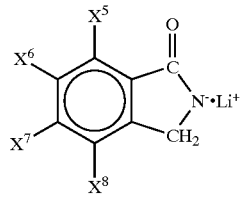

where $X^5$ to $X^8$ are independently hydrogen atoms, F, Cl, Br, I or alkyl groups having 1 to 3 carbon atoms The organic anion constituting the above lithium salts is phthalimide, a derivative of phthalimide, phthalimidine or a derivative of phthalimidine in which the hydrogen atom bound to the nitrogen is removed.

In the case where at least one selected from $X^1$ to $X^8$ is other than a hydrogen atom and the remainders are hydrogen atoms, the radicals other than a hydrogen atom are preferably alkyl groups or fluorine atoms.

Herein, in the case where one selected from $X^1$ to $X^4$ is an alkyl group and the remainders are hydrogen atoms, it is preferable that $X^2$ or $X^3$ is an alkyl group. Also, in the case where one selected from $X^5$ to $X^8$ is an alkyl group and the remainders are hydrogen atoms, it is preferable that $X^6$ or $X^7$ is an alkyl group, and it is particularly preferable that $X^6$ is an alkyl group. In either cases described above, the ethyl group is particularly preferable as the alkyl group.

Further, in the case where two selected from $X^1$ to $X^4$ are fluorine atoms and the remainders are hydrogen atoms, $X^2$ and $X^3$ are preferably fluorine atoms. Also, two selected from $X^5$ to $X^8$ are fluorine atoms and the remainders are hydrogen atoms, $X^6$ and $X^8$ are preferably fluorine atoms.

Among the lithium salts represented by the general formula (1), lithium phthalimide in which the organic anion is a phthalimide group is preferable, for example. Also, among the lithium salts represented by the general formula (2), lithium phthalimidine in which the organic anion is a phthalimidine group is preferable, for example.

The solute to be dissolved in the solvent may comprise another lithium salt in addition to the lithium salt represented by the general formula (1) and/or the lithium salt represented by the general formula (2).

Such lithium salts to be used in combination with the lithium salt represented by the general formula (1) and/or the lithium salt represented by the general formula (2), are preferably $LiPF_6$, $LiBF_4$, $LiClO_4$, $LiCF_3SO_3$ and lithium salts having an imide bond represented by the general formula (3):

$$LiN(C_mX^9{}_{2m+1}SO_2)(C_nX^{10}{}_{2n+1}SO_2)$$

where $X^9$ and $X^{10}$ are independently F, Cl, Br or I, and m and n are independently integers of 1 to 4. They may be used singly or in a combination of two or more of them. Also, among the lithium salts having the aforementioned imide bond, $LiN(CF_3SO_2)_2$, $LiN(C_2F_5SO_2)_2$ and the like are particularly preferable.

Although details are not known, in the case where the lithium salt represented by the general formula (1) and/or the lithium salt represented by the general formula (2) are used in admixture with the lithium salt having the aforementioned imide bond, the charge/discharge cycle characteristics of the secondary battery are improved.

The concentration of the lithium salt represented by the general formula (1) and/or the lithium salt represented by the general formula (2) is preferably in the range of 0.2 to 2.0 mol/liter. Also, in the case where another lithium salt is added, it is preferable that the total concentration of all the lithium salts is in the range of 0.2 to 2.0 mol/liter.

As an organic solvent constituting the liquid non-aqueous electrolyte, it is preferable to mix an organic solvent having a high permittivity such as ethylene carbonate, propylene carbonate, butylene carbonate, γ-butyrolactone, sulfolane, vinylene carbonate or the like with an organic solvent having a low viscosity such, as dimethyl carbonate, ethyl methyl carbonate, diethyl carbonate, 1,2-dimethoxyethane or the like. An organic solvent containing at least one selected from the group consisting of ethylene carbonate, propylene carbonate, butylene carbonate and γ-butyrolactone is particularly preferred.

Examples of the host polymer in the gel non-aqueous electrolyte and the polymer to be used as the solvent in the solid polymer electrolyte include derivatives formed on the basis of polyvinylidene fluoride, polyethylene oxide, polyacrylonitrile, polymethyl methacrylate, polysiloxane and the like.

By combining the aforementioned non-aqueous electrolyte with the given positive electrode and negative electrode, there are provided a primary battery not liable to cause deterioration in the capacity during a long-term storage at high temperatures, as well as a secondary battery not liable to cause deterioration in the capacity during a long-term storage at high temperatures and having excellent charge/discharge cycle characteristics.

The positive electrode can be prepared using materials conventionally used in the positive electrode of the non-aqueous electrolyte batteries. Examples of the material for the positive electrode include metal oxides such as $LiCoO_2$, $LiNiO_2$, $LiMn_2O_4$, $LiMnO_2$, $V_2O_5$, $V_6O_{13}$, $MnO_2$, $WO_3$, $Nb_2O_5$, and $Li_{4/3}Ti_{5/3}O_4$, carbon fluoride represented by $CF_x(x \leq 1)$, sulfides such as $FeS_2$ and $TiS_2$, and conductive polymers such as polypyrrole and polyaniline.

Also, the negative electrode can be prepared using materials conventionally used for the negative electrode of the non-aqueous electrolyte batteries. Examples of the material for the negative electrode include metallic lithium, lithium alloys such as LiAl, LiSi, LiSn, LiNiSi and LiPb, carbon materials such as coke and graphite which are materials capable of absorbing and desorbing lithium, metal oxides such as SiO, SnO, $Fe_2O_3$, $WO_2$, $Nb_2O_5$ and $Li_{4/3}Ti_{5/3}O_4$, and metal nitrides such as $Li_{0.4}CoN$.

As described above, in the non-aqueous electrolyte battery including the non-aqueous electrolyte of the present invention, the deterioration in the capacity caused by the reaction between the highly reactive negative electrode and the non-aqueous electrolyte is suppressed, and the storage property is excellent. In a secondary battery, in addition to the improvement on the storage property, the decrease in the capacity during the repetition of the charge/discharge cycles is also reduced. The reason for this is not clear, however, it is considered that the organic anion of the lithium salt represented by the general formula (1) and/or the lithium salt represented by the general formula (2) reacts with the negative electrode in preference to the organic solvent or the polymer, which are constituting elements of the non-aqueous electrolyte, and forms a stable coating film having a similar structure to phthalimide, phthalimidine or derivatives of these, thereby to suppress the reaction of the organic solvent or the polymer with the negative electrode.

Next, the present invention will be specifically described with reference to examples.

EXAMPLE 1

FIG. 1 shows a longitudinal cross sectional view of a coin-type battery used in this example. The numerals 2 and 6 denote respectively a positive electrode case and a negative electrode case each made of stainless steel, and the numeral 5 denotes an insulating packing made of polypropylene. The numeral 1 denotes a positive electrode and the numeral 4 denotes a negative electrode. The numeral 3 denotes a separator comprising a nonwoven fabric made of polypropylene.

A powder of $LiCoO_2$ as a positive electrode active material, a carbon powder as a conductive agent and a fluorocarbon polymer as a binder were mixed in a weight ratio of 90:5:5, and then dried to give positive electrode material mixture. After the positive electrode material mixture was pressed at 2 ton/cm² and molded into a pellet having 16 mm diameter and 0.9 mm thickness, it was dried at 250° C. in a dried atmosphere containing 1% or less moisture to give a positive electrode.

On the other hand, a natural graphite powder as a negative electrode active material and a fluorocarbon polymer as a binder were mixed in a weight ratio of 95:5 to give a negative electrode material mixture. After this negative electrode material mixture was pressed at 2 ton/cm² and molded into a pellet having 16 mm diameter and 0.9 mm thickness, it was dried at 110° C. in a dried atmosphere containing 1% or less moisture to give a negative electrode.

Ethylene carbonate and diethyl carbonate were mixed in a volume ratio of 5:5 to give a solvent for the non-aqueous electrolyte. In this solvent, the solute as shown in Table 1 or 2 was dissolved in a concentration as shown in Table 1 or 2 (0.05 to 2.5 mol/liter) to give a non-aqueous electrolyte.

Using the aforementioned positive electrode, negative electrode and non-aqueous electrolyte, batteries A1 to F1 and A2 to F2, and battery 1 of a comparative example were prepared. The amount of the non-aqueous electrolyte to be poured into the battery was 100 mg.

Using each battery, a charge/discharge test was carried out. That is, a charge/discharge cycle of the battery was repeated at a constant current of 1 mA/cm² and in a voltage range of 4.2 to 3.0 V. A percentage value (%) of each battery obtained by, dividing the discharge capacity at the 300th cycle by the initial discharge capacity and multiplying the obtained value by 100 is shown as the capacity maintenance rate in Table 1 or 2.

TABLE 1

| | Solute | Concentration | Capacity Maintenance Rate (%) |
|---|---|---|---|
| Battery A1 | phthalimide-NLi structure | 0.05 mol/L | 72 |
| Battery B1 | phthalimide-NLi structure | 0.1 mol/L | 81 |
| Battery C1 | phthalimide-NLi structure | 0.2 mol/L | 88 |
| Battery D1 | phthalimide-NLi structure | 1 mol/L | 91 |
| Battery E1 | phthalimide-NLi structure | 2 mol/L | 89 |
| Battery F1 | phthalimide-NLi structure | 2.5 mol/L | 79 |
| Battery 1 | $LiBF_4$ | 1.0 mol/L | 62 |

TABLE 2

| | Solute | Concentration | Capacity Maintenance Rate (%) |
|---|---|---|---|
| Battery A2 | lithium phthalimide structure | 0.05 mol/L | 70 |
| Battery B2 | lithium phthalimide structure | 0.1 mol/L | 80 |
| Battery C2 | lithium phthalimide structure | 0.2 mol/L | 87 |
| Battery D2 | lithium phthalimide structure | 1 mol/L | 92 |
| Battery E2 | lithium phthalimide structure | 2 mol/L | 88 |

TABLE 2-continued

| | Solute | Concentration | Capacity Maintenance Rate (%) |
|---|---|---|---|
| Battery F2 | lithium phthalimide structure | 2.5 mol/L | 76 |
| Battery 1 | LiBF$_4$ | 1.0 mol/L | 62 |

As shown in Tables 1 and 2, the batteries A1 to F1 and A2 to F2 using the non-aqueous electrolytes of the present invention containing lithium phthalimide or lithium phthalimidine as the solute have high capacity maintenance rates, and when the concentration thereof is in the range of 0.2 to 2.0 mol/liter, particularly high capacity maintenance rates are obtained. When the concentration of the solute is 0.1 mol/liter or less, a satisfactory effect is not achieved; when the concentration of the solute is 2.5 mol/liter, deposition of a lithium salt is observed. Although details are not known, deposition of a lithium salt is considered to be a cause for slightly decreasing the capacity maintenance rate.

On the other hand, in the battery 1 of a comparative example using the conventional non-aqueous electrolyte containing only LiBF$_4$ as the solute the capacity maintenance rate is considerably lower.

From the examination described above, the charge/discharge cycle characteristics of the secondary battery can be improved by using the non-aqueous electrolyte of the present invention.

EXAMPLE 2

Batteries G1 to K1 and G2 to K2, and a battery 2 of a comparative example were prepared in the same manner as in Example 1 except that non-aqueous electrolytes containing a first solute and a second solute as shown in Tables 3 and 4 dissolved in concentrations as shown in Tables 3 and 4 were used, and the charge/discharge test was carried out. Here, in Tables 3 and 4, LiTFPB represents LiB(C$_6$H$_3$(CF$_3$)$_2$)$_4$ (lithium tetrakis(3,5-bis(trifluoromethyl)phenyl)borate). The results are shown in Tables 3 and 4.

TABLE 3

| | First Solute and Concentration thereof | Second Solute and Concentration thereof | Capacity Maintenance Rate (%) |
|---|---|---|---|
| Battery G1 | 0.3 mol/L, lithium phthalimide structure | 1.0 mol/l, LiBF$_4$ | 85 |
| Battery H1 | 0.3 mol/L, difluoro lithium phthalimide structure | 1.0 mol/l, LiBF$_4$ | 89 |

TABLE 3-continued

| | First Solute and Concentration thereof | | Second Solute and Concentration thereof | Capacity Maintenance Rate (%) |
|---|---|---|---|---|
| Battery I1 | 0.3 mol/L, | 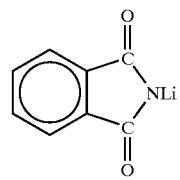 | 1.0 mol/l, LiPF$_6$ | 90 |
| Battery J1 | 0.3 mol/L | 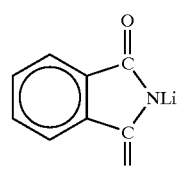 | 1.0 mol/l, LiN(CF$_3$SO$_2$)$_2$ | 94 |
| Battery K1 | 0.3 mol/L, | 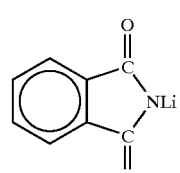 | 1.0 mol/l, LiN(C$_2$F$_5$SO$_2$)$_2$ | 96 |
| Battery 1 | None | | 1.0 mol/l, LiBF$_4$ | 62 |
| Battery 2 | 0.3 mol/L, LiTFPB | | 1.0 mol/l, LiBF$_4$ | 65 |

TABLE 4

| | First Solute and Concentration thereof | | Second Solute and Concentration thereof | Capacity Maintenance Rate (%) |
|---|---|---|---|---|
| Battery G2 | 0.3 mol/L, | 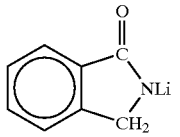 | 1.0 mol/l, LiBF$_4$ | 84 |
| Battery H2 | 0.3 mol/L, | 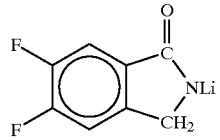 | 1.0 mol/l, LiBF$_4$ | 90 |
| Battery I2 | 0.3 mol/L, | 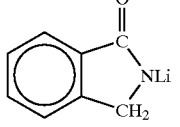 | 1.0 mol/l, LiPF$_6$ | 92 |
| Battery J2 | 0.3 mol/L | 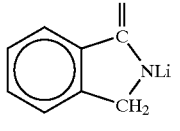 | 1.0 mol/l, LiN(CF$_3$SO$_2$)$_2$ | 95 |

TABLE 4-continued

| | First Solute and Concentration thereof | Second Solute and Concentration thereof | Capacity Maintenance Rate (%) |
|---|---|---|---|
| Battery K2 | 0.3 mol/L, 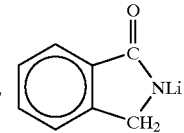 | 1.0 mol/l, $LiN(C_2F_5SO_2)_2$ | 96 |
| Battery 1 | None | 1.0 mol/l, $LiBF_4$ | 62 |
| Battery 2 | 0.3 mol/L, LiTFPB | 1.0 mol/l, $LiBF_4$ | 65 |

As shown in Tables 3 and 4, The batteries G1 to K1 and G2 to K2 using the non-aqueous electrolyte of the present invention containing as a solute the lithium salt represented by the general formula (1) or the lithium salt represented by the general formula (2) have higher capacity maintenance rates than that of the battery 2 of the comparative example. Among these, the batteries containing a non-aqueous electrolyte using the above lithium salt together with LiN$(CF_3SO_2)_2$ or LiN$(C_2F_5SO_2)_2$ having an imide bond have particularly high capacity maintenance rates and are the most excellent in the charge/discharge cycle characteristics.

EXAMPLE 3

In this example, coin-type batteries having the structure shown in FIG. 1 are prepared in the following manner.

Electrolytic manganese dioxide which had been thermally treated at 400° C., carbon black as a conducting agent and a fluorocarbon polymer as a binder were mixed in a weight ratio of 85:8:7 to give a positive electrode material mixture. This positive electrode material mixture was pressed at 2 ton/cm² and molded into a pellet having 16 mm diameter, and then dried at 250° C. in a dried atmosphere containing 1% or less moisture, thereby giving a positive electrode.

As the negative electrode, metal lithium was used.

Propylene carbonate and 1,2-dimethoxyethane were mixed in a volume ratio of 6:4 to give the solvent for the non-aqueous electrolyte. In this solvent, the solute as shown in Table 5 or 6 was dissolved in a concentration as shown in Tables 5 or 6 to give a non-aqueous electrolyte.

TABLE 5

| | First Solute and Concentration thereof | Second Solute and Concentration thereof |
|---|---|---|
| Battery L1 | 0.3 mol/L, 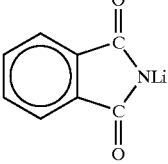 | 0.5 mol/l, $LiClO_4$ |
| Battery M1 | 0.3 mol/L, 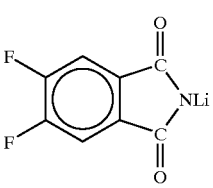 | 0.5 mol/l, $LiClO_4$ |

TABLE 5-continued

| | First Solute and Concentration thereof | Second Solute and Concentration thereof |
|---|---|---|
| Battery 3 | None | 0.5 mol/l, $LiClO_4$ |
| Battery 4 | 0.3 mol/L, LiTFPB | 0.5 mol/l, $LiClO_4$ |

TABLE 6

| | First Solute and Concentration thereof | Second Solute and Concentration thereof |
|---|---|---|
| Battery L2 | 0.3 mol/L, 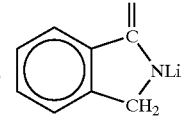 | 0.5 mol/l, $LiClO_4$ |
| Battery M2 | 0.3 mol/L, 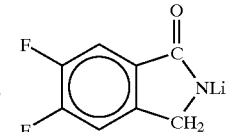 | 0.5 mol/l, $LiClO_4$ |
| Battery 3 | None | 0.5 mol/l, $LiClO_4$ |
| Battery 4 | 0.3 mol/L, LiTFPB | 0.5 mol/l, $LiClO_4$ |

Using the above positive electrode, negative electrode and non-aqueous electrolyte, batteries L1 to M1 and L2 to M2, and batteries 3 and 4 of comparative examples were prepared. The amount of the non-aqueous electrolyte to be poured into the battery was 160 mg.

After storing the respective batteries in a constant-temperature bath at 60° C. for three months, the internal resistance of the respective batteries was measured at an alternating current of 1 kHz. The results are shown in Tables 7 and 8.

TABLE 7

|  | Initial Internal Resistance (Ω) | Internal Resistance after 60° C. - 3 months Storing (Ω) |
|---|---|---|
| Battery L1 | 11.3 | 14.5 |
| Battery M1 | 11.2 | 14.0 |
| Battery 3 | 11.0 | 25.0 |
| Battery 4 | 11.3 | 20.0 |

TABLE 8

|  | Initial Internal Resistance (Ω) | Internal Resistance after 60° C. - 3 months Storing (Ω) |
|---|---|---|
| Battery L2 | 11.9 | 14.3 |
| Battery M2 | 11.7 | 13.9 |
| Battery 3 | 11.0 | 25.0 |
| Battery 4 | 11.3 | 20.0 |

As shown in Tables 7 and 8, the batteries L1 to M1 and L2 to M2 using the non-aqueous electrolyte of the present invention containing the lithium salt represented by the general formula (1) or the lithium salt represented by the general formula (2) have smaller increase in the internal resistance as compared with the batteries 3 and 4 of the comparative examples. As a con it is considered that the reaction of the negative electrode with the solvent, and formation of an organic coating film on the surface of the negative electrode which accompanies the reaction are suppressed even during storage at high temperatures.

From the results of the batteries L1 and M1 and the results of the batteries L2 and M2, it is found that it is preferable that the organic anion of the lithium salt contains a fluorine atom from the viewpoint that the increase in the internal resistance is small.

In the examples as described above, the explanation was made about liquid non-aqueous electrolytes; however, the present invention is also similarly applicable to a gel-like non-aqueous electrolyte and a solid polymer electrolyte. Also, the present invention is similarly applicable to cylindrical and square type batteries.

INDUSTRIAL APPLICABILITY

As described above, the present invention provides a non-aqueous electrolyte which is not liable to react with the negative electrode in a primary battery and a secondary battery during a long-term storage at high temperatures, as well as a non-aqueous electrolyte battery using such electrolyte which is excellent in the storage property. Also, the use of the non-aqueous electrolyte of the present invention permits improvement in the charge/discharge cycle characteristics of the secondary battery.

What is claimed is:

1. A non-aqueous electrolyte comprising a solvent and a solute dissolved in said solvent, wherein said solute comprises at least one selected from the group consisting of lithium salts represented by the general formula (1):

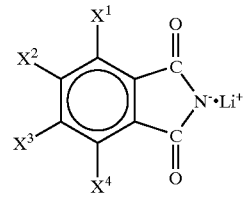

where $X^1$ to $X^4$ are independently hydrogen atoms, F, Cl, Br, I or alkyl groups having 1 to 3 carbon atoms, and lithium salts represented by the general formula (2):

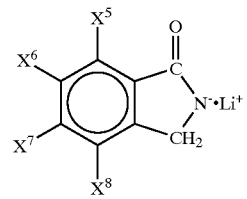

where $X^5$ to $X^8$ are independently hydrogen atoms, F, Cl, Br, I or alkyl groups having 1 to 3 carbon atoms.

2. The non-aqueous electrolyte in accordance with claim 1, wherein said solute further comprises at least one selected from the group consisting of LiPF$_6$, LiBF$_4$, LiClO$_4$, LiCF$_3$SO$_3$ and lithium salts having an imide bond represented by the general formula (3):

$$LiN(C_mX^9_{2m+1}SO_2)(C_nX^{10}_{2n+1}SO_2)$$

where $X^9$ and $X^{10}$ are independently F, Cl, Br or I, and m and n are independently integers of 1 to 4.

3. The non-aqueous electrolyte in accordance with claim 1, wherein said solvent comprises at least one selected from the group consisting of ethylene carbonate, propylene carbonate, butylene carbonate and γ-butyrolactone.

4. The non-aqueous electrolyte in accordance with claim 1, wherein the concentration of said lithium salt represented by the general formula (1) and/or said lithium salt represented by the general formula (2) is 0.2 to 2.0 mol/liter.

5. A non-aqueous electrolyte battery comprising; a positive electrode; a negative electrode comprising at least one selected from the group consisting of metallic lithium, an lithium alloy and a material capable of absorbing and desorbing lithium; and the non-aqueous electrolyte in accordance with claim 1.

* * * * *